(12) United States Patent
Danguchi et al.

(10) Patent No.: US 12,480,284 B2
(45) Date of Patent: Nov. 25, 2025

(54) CONSTRUCTION MACHINE

(71) Applicant: Yanmar Holdings Co., Ltd., Osaka (JP)

(72) Inventors: Masashi Danguchi, Fukuoka (JP); Shogo Suzuki, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 315 days.

(21) Appl. No.: 18/030,999

(22) PCT Filed: Aug. 31, 2021

(86) PCT No.: PCT/JP2021/031937
§ 371 (c)(1),
(2) Date: Apr. 9, 2023

(87) PCT Pub. No.: WO2022/080025
PCT Pub. Date: Apr. 21, 2022

(65) Prior Publication Data
US 2023/0374756 A1    Nov. 23, 2023

(30) Foreign Application Priority Data
Oct. 12, 2020 (JP) .................. 2020-171620

(51) Int. Cl.
*E02F 9/26* (2006.01)
*B60Q 9/00* (2006.01)
*B60R 1/27* (2022.01)
*E02F 3/32* (2006.01)

(52) U.S. Cl.
CPC ............ *E02F 9/262* (2013.01); *B60Q 9/008* (2013.01); *B60R 1/27* (2022.01); *E02F 3/325* (2013.01)

(58) Field of Classification Search
CPC . E02F 9/262; E02F 3/325; B60R 1/27; B60Q 9/008
USPC ............................................. 701/28
See application file for complete search history.

(56) References Cited

U.S. PATENT DOCUMENTS

| | | | |
|---|---|---|---|
| 9,043,129 B2 * | 5/2015 | Bonefas | G05D 1/0223 701/300 |
| 2019/0241124 A1 * | 8/2019 | Izumikawa | G08B 21/24 |
| 2021/0002863 A1 * | 1/2021 | Sakuta | E02F 9/205 |
| 2025/0092637 A1 * | 3/2025 | Nishigori | B60Q 1/0035 |
| 2025/0122010 A1 * | 4/2025 | Miller | B65F 3/046 |

FOREIGN PATENT DOCUMENTS

| | | |
|---|---|---|
| JP | 2006257724 A | 9/2006 |
| JP | 2021088840 A | 6/2021 |

* cited by examiner

*Primary Examiner* — Yazan A Soofi
(74) *Attorney, Agent, or Firm* — Chris Mizumoto (57) ABSTRACT

This hydraulic excavator serves as a construction machine and is equipped with: a monitoring unit for monitoring the periphery around the construction machine; and a control unit for controlling the execution of a construction machine operation restriction based on the monitoring results of the monitoring unit according to the operating mode of the construction machine. The control unit executes the operation restriction based on the monitoring results when the operation mode is a normal mode which is not a specific mode, and stops execution of the operation restriction based on the monitoring results when the operation mode is the specific mode.

7 Claims, 4 Drawing Sheets

CONSTRUCTION MACHINE

CROSS-REFERENCE

This application is a US National Stage Application under 35 U.S.C. § 371 of International Application No. PCT/JP2021/031937 filed Aug. 31, 2021 which claims foreign priority of JP2020-171620 filed Oct. 12, 2020 and the disclosures of which are hereby incorporated by reference in their entirety.

TECHNICAL FIELD

The present invention relates to a construction machine.

BACKGROUND ART

Conventionally, various types of construction machines such as excavators have been proposed. For example, Patent Literature 1 discloses an excavator that limits the excavator's operation or announces that an object has been detected when an object is detected in the surroundings of the excavator by an object detector.

CITATION LIST

Patent Literature

Patent Literature 1: WO 2018/008504

DISCLOSURE OF INVENTION

Problems to be Solved by the Invention

In some cases, the operation modes of an excavator includes a normal mode for normal motions or work such as traveling, revolving, and excavating and a specific operation mode (hereinafter referred to as "specific mode") such as a crane mode for lifting work. As described in Patent Literature 1, uniformly limiting the excavator's operation (e.g., stopping its motion) when an object is detected around the excavator, regardless of the excavator's operation mode, may not always be appropriate in terms of avoiding hazards.

For example, if motion regulation is applied during lifting operations in the crane mode to abruptly stop revolving, traveling, and lifting and lowering motions of a work machine on the basis of detection of surrounding objects, the suspended object may violently move around due to inertial forces and collide with surrounding people, objects, or other objects.

The present invention was made to solve the above problems, an object of which is to provide a construction machine that, in an operation mode other than a specific mode (e.g., crane mode), avoids hazards that could normally occur through motion regulation based on the surrounding conditions of the construction machine, while, in the specific mode, avoids hazards that may result from regulating the motion, thereby ensuring the safety of work.

Means for Solving the Problems

A construction machine according to an aspect of the present invention includes a monitoring unit that monitors surroundings of the construction machine; and a control unit that controls execution of motion regulation of the construction machine based on a monitoring result of the monitoring unit in accordance with an operation mode of the construction machine, wherein the control unit executes the motion regulation based on the monitoring result of the monitoring unit when the operation mode is a normal mode other than a specific mode, while the control unit stops the execution of the motion regulation based on the monitoring result when the operation mode is the specific mode.

Effect of the Invention

In a mode (normal mode) other than a specific mode, motion regulation is executed on the basis of the surrounding conditions (monitoring results) of a construction machine, thereby avoiding hazards that could normally occur, such as the construction machine colliding with surrounding obstacles. On the other hand, in the specific mode, the execution of motion regulation based on the surrounding conditions is stopped to avoid hazards that may result from motion control, thereby ensuring work safety.

DESCRIPTION OF EMBODIMENTS

Embodiments of the present invention are described below with reference to the drawings.

1. Construction Machine

Figure 1:
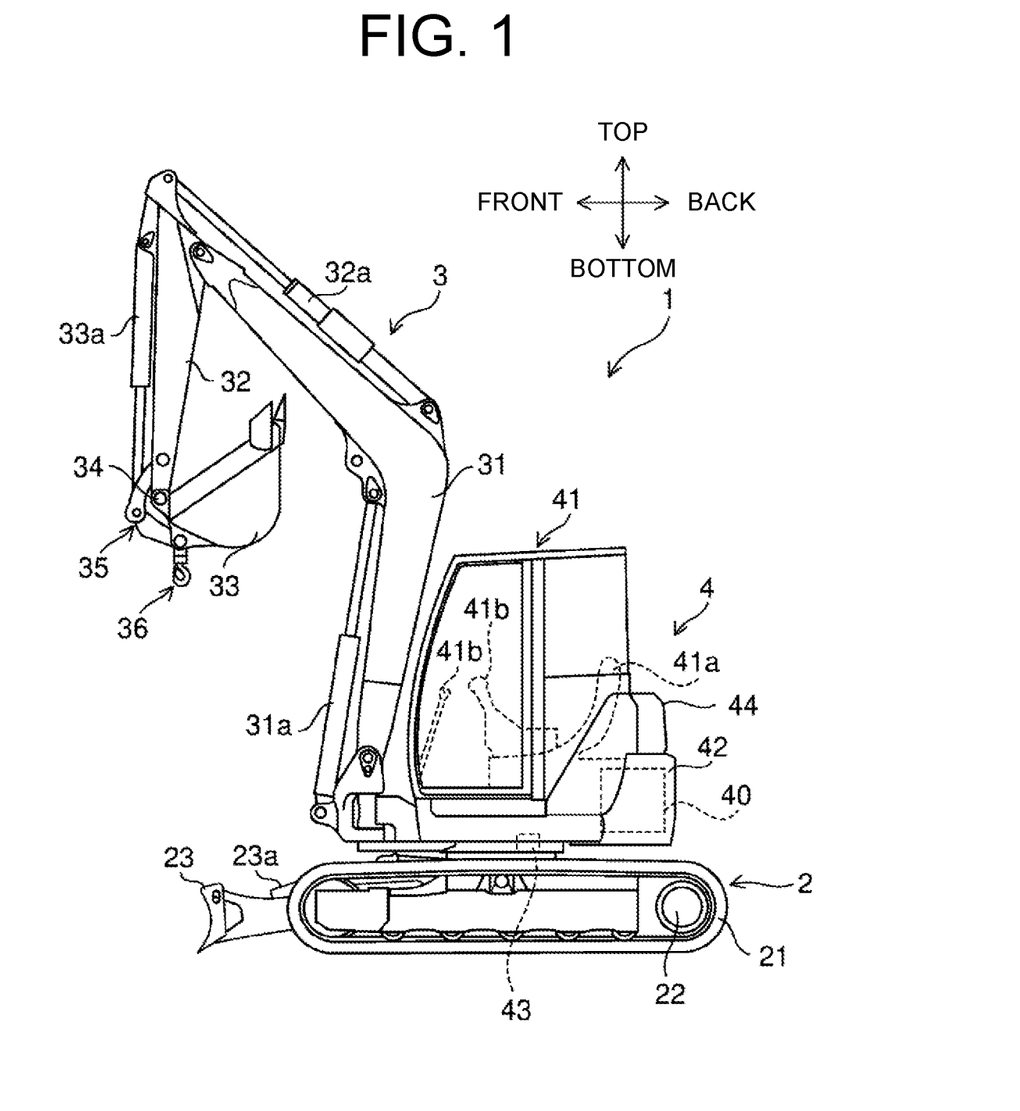
FIG. 1 is a schematic side view of a hydraulic excavator, which is an example of a construction machine according to an embodiment of the present invention.

FIG. 1 is a schematic side view of a configuration of a hydraulic excavator 1 which is an example of a construction machine according to the present embodiment. The hydraulic excavator 1 includes a lower traveling body 2, a work machine 3, and an upper revolving body 4.

Here, in FIG. 1, directions are defined as follows. First, the direction in which the lower traveling body 2 travels straight ahead is defined as a front-rear direction, one and other sides thereof are defined as "front" and "rear," respectively. In FIG. 1, a blade 23 side with respect to a traveling motor 22 is exemplarily shown as "front". In addition, a horizontal direction perpendicular to the front-rear direction is defined as a left-right direction. In this case, the left side is "left" and the right side is "right" as viewed from an operator (manipulator) seated on an operator seat 41*a*. Furthermore, a direction of gravity perpendicular to the front-rear and left-right directions is defined as a vertical direction, and upstream and downstream sides of the direction of gravity are defined as "up" and "down," respectively.

The lower traveling body 2 is driven by power from an engine 40 to cause the hydraulic excavator 1 to travel. The lower traveling body 2 includes left and right crawlers 21 and left and right traveling motors 22. Each of the traveling motors 22 is a hydraulic motor. The left and right traveling motors 22 drive the left and right crawlers 21, respectively, and thereby allows the hydraulic excavator 1 to move forward and backward. The lower traveling body 2 includes the blade 23 for performing ground leveling work, and a blade cylinder 23*a*. The blade cylinder 23*a* is a hydraulic cylinder to pivot the blade 23 in the vertical direction.

The work machine 3 is driven by power from the engine 40 and performs excavation work to dig out earth and sand. The work machine 3 includes a boom 31, an arm 32, and a bucket 33. The boom 31, the arm 32, and the bucket 33 can be driven independently to perform excavation work.

The boom 31 is pivoted by a boom cylinder 31a. A proximal portion of the boom cylinder 31a is supported by a front portion of the upper revolving body 4, and the boom cylinder 31a can move in a freely extendable manner. The arm 32 is pivoted by an arm cylinder 32a. A proximal portion of the arm cylinder 32a is supported by a tip of the boom 31, and the arm cylinder 32a can move in a freely extendable manner. The bucket 33 is pivoted by a bucket cylinder 33a. A proximal portion of the bucket cylinder 33a is supported by a tip of the arm 32, and the bucket cylinder 33a can move in a freely extendable manner. Each of the boom cylinder 31a, the arm cylinder 32a, and the bucket cylinder 33a is composed of a hydraulic cylinder.

The bucket 33 is a container-like component with claws for excavation work, located at the tip of the work machine 3. The bucket 33 is pivotably attached to the tip of the arm 32 via a pin 34. In addition, the bucket 33 is connected to the bucket cylinder 33a via a link mechanism 35.

A hook 36 for crane work is attached to the tip of the arm 32. The hook 36 is a hook-shaped member for the crane work and is pivotably attached to the link mechanism 35. Here, the crane work refers to lifting work in which an object to be worked is lifted up or down. The hook 36 is pivotably supported by the shaft of the link mechanism 35 as a turning fulcrum, and can change its orientation between an extended state (see FIG. 1) in which the hook 36 extends from the bucket 33 and a retracted state (not illustrated) in which the hook 36 retracts to the bucket 33 side. For example, when excavation work is performed with the bucket 33, the hook 36 enters the retracted state. When the crane work is performed with the hook 36, the hook 36 enters the extended state.

The upper revolving body 4 is revolvable relative to the lower traveling body 2 via a slewing bearing (not illustrated). An operation section 41, a revolving table 42, a revolving motor 43, an engine room 44, etc., are arranged in the upper revolving body 4. The upper revolving body 4 is driven by the revolving motor 43 or a hydraulic motor to revolve via the slewing bearing. At the rear portion of the upper revolving body 4, there are arranged a plurality of hydraulic pumps P0 (see FIG. 2), as well as the engine 40 to provide power to various parts.

Each of the hydraulic pumps P0 supplies hydraulic oil (pressure oil) to a hydraulic motor (e.g., the left and right traveling motors 22 and the revolving motor 43) and a hydraulic cylinder (e.g., the blade cylinder 23a, the boom cylinder 31a, the arm cylinder 32a, and the bucket cylinder 33a). The hydraulic motor and the hydraulic cylinder, which are driven with the hydraulic oil supplied from any of the hydraulic pumps P0, are collectively referred to as a hydraulic actuator AC (see FIG. 2).

An operator seat 41a on which the operator rides is located in the operation section 41. A manipulation unit 41b is placed around the operator seat 41a (especially forward, left and right side).

The manipulation unit 41b consists of an operation lever, a switch, a button, etc., to drive the hydraulic actuator AC. By sitting on the operator seat 41a and operating the manipulation unit 41b, the operator can actuate the hydraulic actuator AC. This allows the lower traveling body 2 to travel, the blade 23 to perform ground leveling work, the work machine 3 to perform excavation work and crane work, and the upper revolving body 4 to revolve, etc.

The hydraulic excavator 1 has a normal mode and a crane mode as operation modes. The normal mode is an operation mode in which motions or work such as traveling (drive of the lower traveling body 2), revolving (drive of the upper revolving body 4), and excavating (drive of the work machine 3) can be performed. In the normal mode, the operator can manipulate the manipulation unit 41b to cause the hydraulic excavator 1 to operation in the normal mode and can perform traveling, revolving, excavating, etc. On the other hand, the crane mode is an operation mode in which crane work, where an object to be worked is stopped by the hook 36, can be performed. The operator manipulates an input unit 72 (see FIG. 2) described below to set the crane mode and then manipulates the manipulation unit 41b to cause the hydraulic excavator 1 to perform the crane work.

2. Configuration of Main Part of Hydraulic Excavator

Figure 2:
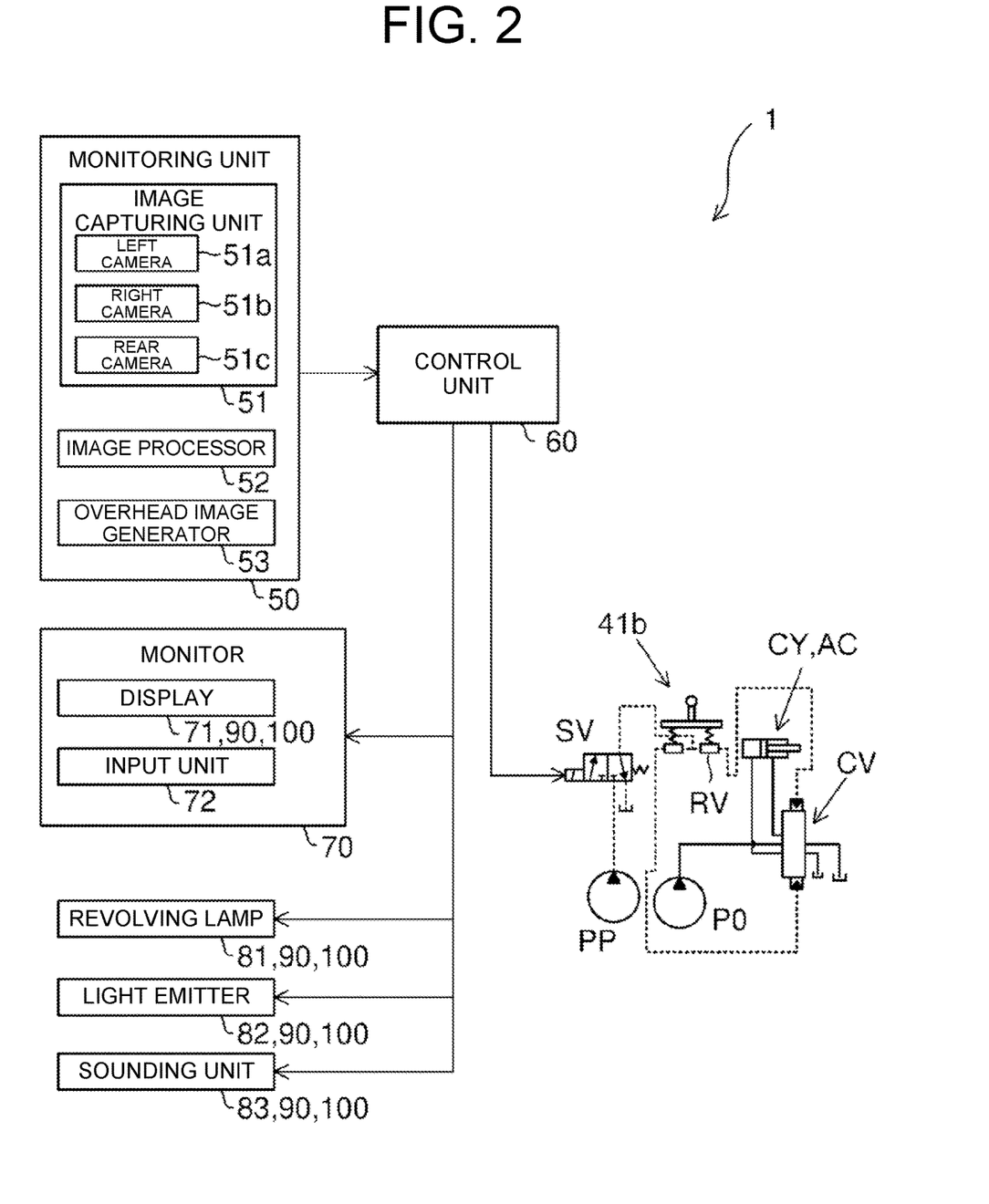
FIG. 2 is an explanatory diagram illustrating a configuration of a main part of the hydraulic excavator.

FIG. 2 schematically illustrates a configuration of a main part of the hydraulic excavator 1. The hydraulic excavator 1 further includes a monitoring unit 50, a control unit 60, a monitor 70, a revolving lamp 81, a light emitter 82, and a sounding unit 83.

2-1. Monitoring Unit

The monitoring unit 50 detects whether or not an obstacle is present in the surroundings of the hydraulic excavator 1, thereby monitoring the surroundings. The obstacle may include a monitoring target such as a human, an object, or an animal. Namely, the hydraulic excavator 1 is provided with the monitoring unit 50 to monitor surroundings of the hydraulic excavator 1. In the present embodiment, the monitoring unit 50 monitors the surroundings of the hydraulic excavator 1 by acquiring images of the surroundings of the hydraulic excavator 1. Described more specifically, the monitoring unit 50 has the following configuration.

The monitoring unit 50 includes an image capturing unit 51, an image processor 52, and an overhead image generator 53. The image capturing unit 51 includes a left camera 51a, a right camera 51b, and a rear camera 51c, which capture images of a left side, a right side, and a rear side of the hydraulic excavator 1, respectively. The image capturing unit 51 captures a moving image, for example, but it may capture a still image at a predetermined frame cycle.

The image processor 52 performs image recognition processing on an image (e.g., a right side image) captured by the image capturing unit 51 as an input, thereby detecting whether an object in the above mentioned image is an obstacle and detecting objects entering a monitoring area.

The overhead image generator 53 generates an overhead image (overhead image) centering around the hydraulic excavator 1 by performing image processing on a plurality of images captured by a plurality of cameras (the left camera 51a, the right camera 51b, and the rear camera 51c) of the image capturing unit 51.

The image processor 52 and the overhead image generator 53 described above consist of, for example, a central processing unit called a CPU (central processing unit) or a computing device such as a GPU (graphics processing unit).

As long as an obstacle can be detected by the monitoring unit 50 within a given range, the number of cameras, the installation locations, and the installation method are not particularly limited. Obstacles may be detected with an obstacle sensor in place of a camera. As the obstacle sensor, any known distance measuring device capable of acquiring distance information of the obstacle can be applied. The obstacle sensor may be, for example, an ultrasonic radar using ultrasonic waves, a millimeter wave radar using millimeter wave band radio waves, a LIDER that measures scattered light in response to laser radiation and calculates a distance, or a stereo camera that includes a plurality of cameras and measures the distance from a captured image to an object.

2-2. Control Unit

The control unit 60 controls the motion of each part of the hydraulic excavator 1. In particular, in the present embodiment, the control unit 60 executes motion regulation of the hydraulic excavator 1 based on monitoring results of the monitoring unit 50 when the operation mode of the hydraulic excavator 1 is, for example, the normal mode, and when the operation mode of the hydraulic excavator 1 is, for example, the crane mode, the control unit 60 stops the execution of motion regulation of the hydraulic excavator 1 based on monitoring results of the monitoring unit 50. That is, the hydraulic excavator 1 includes the control unit 60 that controls the execution of motion regulation of the hydraulic excavator 1 based on monitoring results of the monitoring unit 50 in accordance with the operation mode of the hydraulic excavator 1. Such the control unit 60 is configured as an electronic control unit referred as to an ECU (Electronic Control Unit). The above motion regulation include, for example, complete stopping of travelling and other motions, limiting (slowing down) the traveling speed, and reducing engine speed. Details of operation under the control by the control unit 60 is to be described below.

The control unit 60 may include a storage unit. The storage unit stores programs and various information to run the control unit 60. A RAM (random access memory), a ROM (read only memory), a nonvolatile memory, and the like can be used as such a storage unit.

2-3. Monitor

The monitor 70 is located in the vicinity of (e.g., diagonally forward of) the operator seat 41a and displays various types of information to provide necessary information to the operator sitting on the operator seat 41a. The monitor 70 includes a display 71 and an input unit 72. The monitor 70 itself may have an ECU (monitor ECU) inside, and it may be configured so that the monitor ECU controls each part of the monitor 70.

Figure 3:
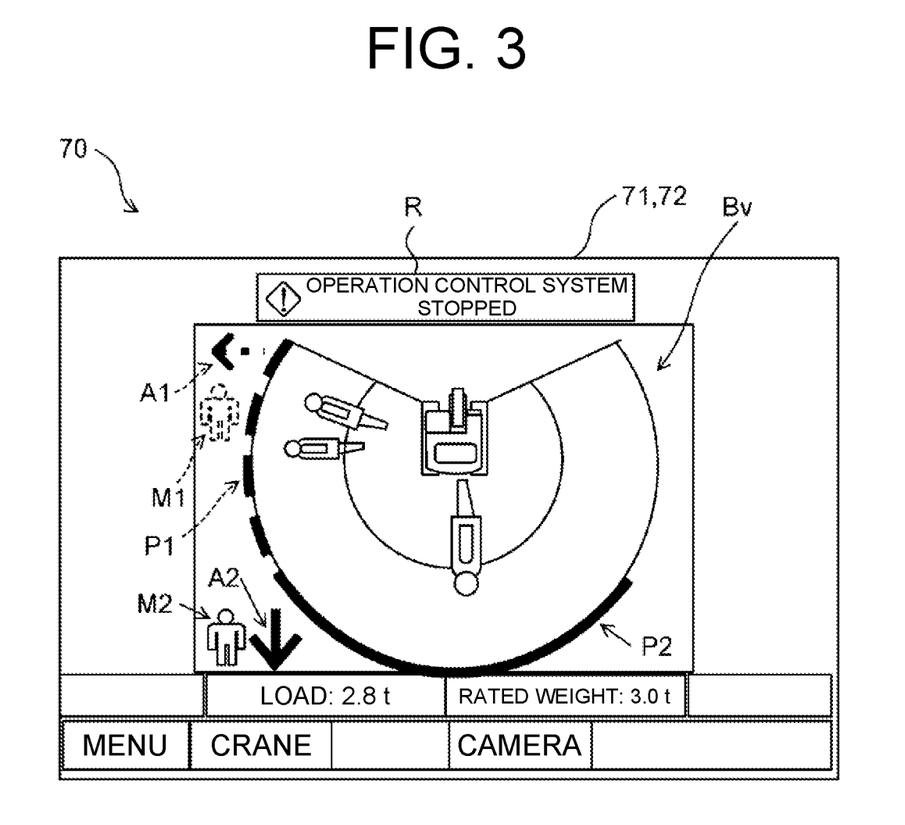
FIG. 3 is an explanatory diagram illustrating an example of a display screen of a display of the hydraulic excavator.

The display 71 is composed of, for example, a liquid crystal display, and displays an image acquired by the monitoring unit 50. For example, FIG. 3 schematically illustrates an example of a display screen of the display 71. The drawing illustrates an overhead image By created by the image processor 52 from images captured and acquired by the left camera 51a, the right camera 51b, and the rear camera 51c, which constitute the image capturing unit 51 of the monitoring unit 50, and displayed on the display 71. Besides the overhead image By, the images acquired by the left camera 51a, the right camera 51b, and the rear camera 51c may be displayed on the display 71. In this way, the hydraulic excavator 1 according to the present embodiment includes the display 71 to display the images obtained by the monitoring unit 50.

The display 71 displays information (icons, text, etc.) indicating that an obstacle has been detected when the obstacle is detected by the monitoring unit 50. For example, FIG. 3 illustrates a state in which the following items are simultaneously displayed outside the display area of the overhead image By on the display 71: an icon M1 indicating that the obstacles on the left side is a "person" when "persons," which are examples of obstacles are detected by the monitoring unit 50 on the left side and the rear side of the hydraulic excavator 1; an icon A1 or a left-pointing arrow indicating that a "person" has been detected on the left side of hydraulic excavator 1; position information P1 indicating that the detection direction is to the left of the hydraulic excavator 1 (illustrated in FIG. 3 as a dashed thick arc); an icon M2 indicating that the obstacle on the rear side is a "person"; an icon A2 or a rear-pointing arrow indicating that a "person" has been detected on the rear side of the hydraulic excavator 1; and position information P2 indicating that the detection direction is to the rear of the hydraulic excavator 1 (illustrated in FIG. 3 as a solid thick arc).

By displaying the icon M1, etc., on the display 71, the operator can immediately grasp that the monitoring unit 50 has detected an obstacle, the type of obstacle (whether it is a person or not), and the direction in which the obstacle is detected by looking at the icon M1, etc., displayed on the display 71.

The icons may be color-coded on the display 71 in accordance with the distance from the hydraulic excavator 1 to an obstacle. For example, when the distance from the hydraulic excavator 1 to an obstacle is measured by the monitoring unit 50, the icon M1, etc., may be displayed in yellow if the above distance is less than two meters, and in red if the above distance is two meters or more.

As described below, the display 71 also displays information indicating the stoppage of the execution of the motion regulation when the execution of the motion regulation based on the monitoring results of the monitoring unit 50 is stopped in a specific operation mode (e.g., the crane mode). FIG. 3 illustrates a state in which text information "Operation Limiting System Stopped" is displayed on the upper side of the display area of the overhead image By on the display 71, as information R indicating the stoppage of the execution of the motion regulation. A specific operation mode, such as the crane mode, is also referred to as "specific mode" in the following.

In addition to the above, various types of information are also displayed on the display 71, such as whether the operation mode of the hydraulic excavator 1 is the crane mode, the amount of fuel, warning information regarding seat belt installation, etc. When the operation mode is the crane mode, information on the rated weight (e.g., 3.0 tons in FIG. 3) and the current suspended load (e.g., 2.8 tons in FIG. 3) are also displayed on the display 71.

The operator can operate the input unit 72 to set and input various types of information. The input unit 72 consists of, for example, a touch panel input device that is superimposed on the display 71. The input unit 72 may consist of mechanical input buttons or a jog dial. The operator can set the crane mode as the operation mode of the hydraulic excavator 1 by operating (e.g., pressing) the input unit 72. In the example in FIG. 3, the crane mode can be set by the operator pressing the "crane" display area (the input position of the input unit 72) on the display screen of the display 71. In this way, the hydraulic excavator 1 includes an input unit 72 that accepts specific mode settings.

By pressing the "camera" display area (an input position of the input unit 72) on the display screen of the display 71, the operator can switch the images displayed on display 71 between the overhead image By and the individual camera images (the images acquired by the left camera 51a, the right camera 51b, and the rear camera 51c).

2-4. Revolving Lamp, Light Emitter, Sounding Unit

The revolving lamp 81 illustrated in FIG. 2 consists of a lamp that rotates when the monitoring unit 50 detects an obstacle. The light emitter 82 consists of, for example, a light-emitting diode (LED) that lights up or blinks when the monitoring unit 50 detects an obstacle. The sounding unit 83 consists of a buzzer that makes a sound when the monitoring unit 50 detects an obstacle. The sounding unit 83 may consist of an audio output unit that outputs voice (electronic sound) when the monitoring unit 50 detects an obstacle. The rotation of the revolving lamp 82, the lighting up (or blinking) of the light emitter 82, and the output of a buzzer sound or voice of the sounding unit 63 allow the operator to recognize that the monitoring unit 50 has detected an obstacle.

As described above, the display 71 of the monitor 70, the revolving lamp 81, the light emitter 82, and the sounding unit 83 output an alarm by displaying an icon or the like, rotating a lamp, emitting light, and making a sound, respectively, when the monitoring unit 50 detects an obstacle. Accordingly, it can be said that the display 71, the revolving lamp 81, the light emitter 82, and the sounding unit 83 constitute an alarm device 90 that outputs an alarm on the basis of the monitoring result of the monitoring unit 50. That is, the hydraulic excavator 1 according to the present embodiment includes the alarm device 90, which outputs an alarm on the basis of the monitoring result of the monitoring unit 50. The alarm device 90 only has to include at least one of the display 71, the revolving lamp 81, the light emitter 82, and the sounding unit 83, not necessarily all of them.

In the present embodiment, when the control unit 60 stops the execution of the motion regulation of the hydraulic excavator 1 in a specific mode (e.g., the crane mode), the lamp of the revolving lamp 81 rotates, the light emitter 82 lights or blinks, and the sounding unit 83 outputs a sound or voice indicating that the execution of the motion regulation has been stopped. Therefore, the display 71, the revolving lamp 81, the light emitter 82, and the sounding unit 83 of the monitor 70 can be said to constitute an execution stoppage announcing device 100 that announces that the execution of the motion regulation has been stopped when the control unit 60 stops the motion regulation of the hydraulic excavator 1 in a specific operation mode (e.g., the crane mode) by display, revolution of a lamp, light emission, and sound output. That is, the hydraulic excavator 1 of the present embodiment includes the execution stoppage announcing device 100 that announces the stoppage of the execution of the motion regulation when the control unit 60 stops the execution of the motion regulation based on the monitoring result of the monitoring unit 50. The execution stoppage announcing device 100 only has to include at least one of the display 71, the revolving lamp 81, the light emitter 82, and the sounding unit 83, not necessarily all of them.

3. Hydraulic Circuit

Next, a hydraulic circuit of the hydraulic excavator 1 is described with reference to FIGS. 1 and 2. The hydraulic excavator 1 includes a plurality of hydraulic actuators AC, hydraulic pumps P0 that pump pressure oil to the hydraulic actuators AC, and a pilot pump PP. For the convenience of explanation, FIG. 2 illustrates a hydraulic circuit corresponding to one hydraulic actuator AC. However, the other hydraulic actuators AC have a similar hydraulic circuit.

The plurality of hydraulic actuators AC includes the left and right traveling motors 22 or hydraulic actuators for traveling to drive the lower traveling body 2, the blade cylinder 23a or a hydraulic actuator to vertically pivot the blade 23, the revolving motor 43 or a hydraulic actuator for revolving to drive the upper revolving body 3, and the boom cylinder 31a, the arm cylinder 32a, and the bucket cylinder 33a each of which is a hydraulic actuator for work to drive the work machine 3. The blade cylinder 23a, the boom cylinder 31a, the arm cylinder 32a, and the bucket cylinder 33a are collectively referred to as a hydraulic cylinder CY.

The hydraulic excavator 1 have a so-called boom swing function that swings the work machine 3 (the boom 31) in a left-right direction relative to the upper revolving body 4. When the hydraulic excavator 1 has the boom swing function, the hydraulic cylinder CY also includes a swing cylinder or a hydraulic actuator to swing the boom 31. In general, the boom swing function is applied to a mini excavator (small hydraulic excavator) used for construction in a narrow place.

The hydraulic pumps P0 consist of a variable displacement pump and a fixed displacement pump, and is driven by the engine 40. The variable displacement pump pumps the pressure oil to the left and right traveling motors 22, the boom cylinder 31a, the arm cylinder 32a, and the bucket cylinder 33a. The fixed displacement pump pumps the pressure oil to the blade cylinder 23a, the revolving motor 43, and a swing cylinder (not illustrated).

The actuators AC are provided with corresponding direction switching valves CV. The direction switching valves CV are pilot-type direction switching valves that switch the direction and flow rate of the pressure oil pumped from the hydraulic pumps P0 (variable displacement pumps or fixed displacement pumps), also called a control valves. The direction switching valves CV according to the present embodiment each includes, for example, a direction switching valve corresponding to the left and right traveling motors 22, a direction switching valve corresponding to the boom cylinder 31a, a direction switching valve corresponding to the arm cylinder 32a, a direction switching valve corresponding to the bucket cylinder 33a, a direction switching valve corresponding to the blade cylinder 23a, a direction switching valve corresponding to the revolving motor 43, and a direction switching valve corresponding to the swing cylinder.

The pilot pumps PP discharges pilot oil that serves as an input command to the direction switching valves CV. The pilot pump PP driven by the engine 40 discharges the pressure oil to generate pilot pressure in pilot oil paths. The hydraulic excavator 1 is provided with the pilot oil paths leading to the respective direction switching valves CV from the pilot pump PP.

The manipulation unit 41b has remote control valves RV for switching the direction and pressure of the pressure oil supplied to the direction switching valves CV. The pressure oil discharged from the pilot pump PP is supplied to the remote control valves RV. The remote control valves RV generate the pilot pressure in accordance with the operating direction and operating amount of the manipulation unit 41b. The manipulation unit 41b includes, for example, a traveling lever to cause the hydraulic excavator 1 to travel and an operation lever to operate the work machine 3.

A solenoid valve SV is provided in the oil path between the pilot pump PP and each remote control valve RV. In response to control commands from the control unit 60, the solenoid valve SV adjusts the pilot pressure generated by the pilot pump PP. Adjusting the pilot pressure can, for example, simultaneously stop the driving of the hydraulic actuators AC and uniformly control the drive speeds of the hydraulic actuators AC.

4. Operation

Figure 4:
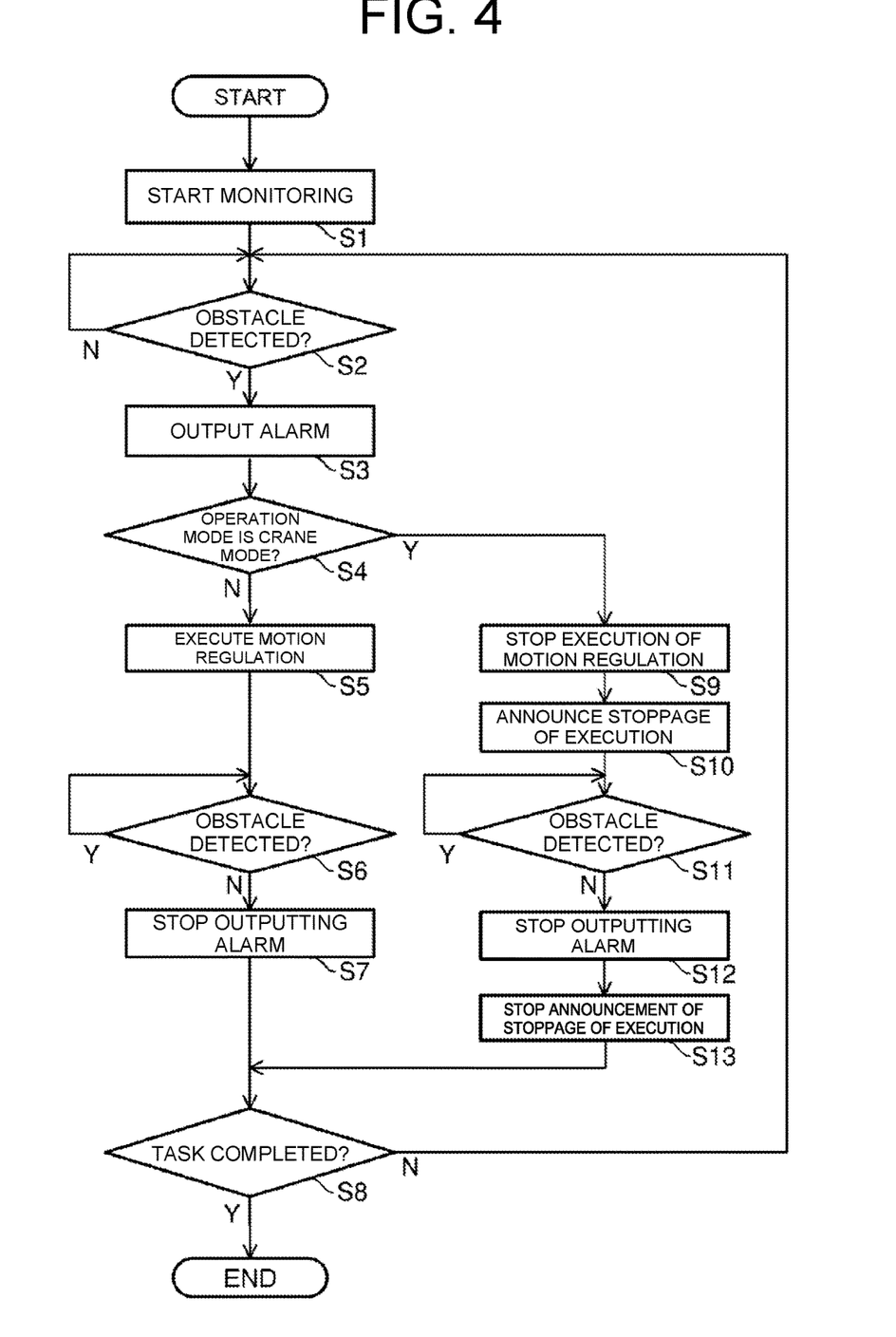
FIG. 4 is a flowchart illustrating an operation flow the hydraulic excavator.

Next, an operation of the hydraulic excavator 1 having the above configuration is described. FIG. 4 is a flowchart illustrating an example of the operation flow of the hydraulic excavator 1 under the control by the control unit 60. When the operator gets in the operation section 41 of the hydraulic excavator 1, sits on the operator seat 41a, operates the manipulation unit 41b (e.g., turn an ignition key), and starts the engine 40, monitoring of the surroundings by the monitoring unit 50 starts (step S1).

If the monitoring unit 50 detects an obstacle in the surroundings of the hydraulic excavator 1 (Yes in S2), the control unit 60 causes an alarm to be output from the alarm device 90 (step S3). For example, as illustrated in FIG. 3, the control unit 60 causes the display 71, which functions as the alarm device 90, to display the icons M1, M2, A1, and A2, and the position information P1 and P2 of obstacles, along with the overhead image By generated by the monitoring unit 50. If necessary, the control unit 60 controls at least one of the revolving lamp 81, the light emitter 82, and the sounding unit 83 to output an alarm indicating that an obstacle has been detected (for example, by rotating the revolving lamp, turning on an LED, or outputting a sound).

In step S3, the operator can freely set whether or not to have the alarm device 90 output an alarm by operating the input unit 72. For example, in step S3, the control unit 60 can control the display 71 to display the overhead image By while not displaying any alarms (such as the icon M1) on the basis of an operation of the input unit 72 by the operator.

Next, the control unit 60 determines whether the operation mode of the hydraulic excavator 1 is set to the crane mode by operation of the input unit 72 (step S4). If the crane mode is not set (No in step S4), the control unit 60 executes motion regulation for the hydraulic excavator 1 (step S5) to avoid the risk of collision with an obstacle while the hydraulic excavator 1 is working in the normal mode. For example, the control unit 60 controls the hydraulic excavator 1 to stop traveling and revolving. More specifically, control unit 60 outputs a control command to a solenoid valve SV to shut off the pilot pressure corresponding to a predetermined hydraulic actuator AC. This allows the predetermined hydraulic actuator AC to be locked to stop the traveling and revolving of the hydraulic excavator 1.

If the obstacle is no longer detected by the monitoring unit 50, such as when the obstacle leaves the monitoring area of the monitoring unit 50 (step S6), the control unit 60 stops the output of alarms by the monitoring unit 50 (step S7). For example, the control unit 60 hides the icon M1, etc., on the display 71. The process from S2 onward is repeated until the engine 40 is stopped by the operator, that is, until the work with the hydraulic excavator 1 is completed (No in step S8), and when the work is completed (Yes in step S8), the series of processes is completed.

If the operation mode of the hydraulic excavator 1 is set to the crane mode in step S4 (Yes in step S4), the control unit 60 determines that restricting the motion of the hydraulic excavator 1 will increase the risk and stops the execution of the motion regulation of the hydraulic excavator 1 (step S9). This allows the operator to properly operate the boom 31, the arm 32, etc., of the work machine 3 using the manipulation unit 41b to avoid the risk of the object suspended by the crane work colliding with an obstacle.

When the execution of the motion regulation is stopped at step S9, the control unit 60 causes the stoppage of the execution of the motion regulation to be announced by the execution stoppage announcing device 100 (step S10). For example, as illustrated in FIG. 3, the control unit 60 displays the information R indicating the stoppage of the execution of the motion regulation on the upper side of the display area of the overhead image By on the display 71, which functions as the execution stoppage announcing device 100. If necessary, the control unit 60 controls at least one of the revolving lamp 81, the light emitter 82, and the sounding unit 83 to announce the stoppage of the execution of the motion regulation (e.g., rotating the revolving lamp at low speed, blinking the LED, or outputting a buzzing sound).

Thereafter, when the obstacle is no longer detected by the monitoring unit 50, such as when the obstacle leaves the monitoring area of the monitoring unit 50 (step S11), the control unit 60 stops the output of alarms by the alarm device 90 (step S12), as in step S7. The control unit 60 then stops the announcement of the stoppage of the execution of the motion regulation by the execution stoppage announcing device 100 (step S13). For example, the control unit 60 hides the information R on the display 71. The process then returns to step S8, and the same processes as above are executed.

5. Effect

As described above, the control unit 60 executes the motion regulation based on the monitoring results of the monitoring unit 50 when the operation mode of the hydraulic excavator 1 is the normal mode other than the specific mode, while it stops executing the motion regulation based on the monitoring results of the monitoring unit 50 when the operation mode is the specific mode (steps S4, S5, and S9).

When the operation mode of the hydraulic excavator 1 is the normal mode (e.g., operation mode for traveling, revolving, excavating, etc.) and the monitoring unit 50 detects an obstacle, the motion regulation is executed, e.g., the hydraulic excavator 1 stops traveling. This can avoid hazards that would normally occur, such as collisions with obstacles while the hydraulic excavator 1 is traveling. When the operation mode of the hydraulic excavator 1 is a specific mode (e.g., the crane mode), even if the monitoring unit 50 detects an obstacle, motion regulation of the hydraulic excavator 1 is not executed. In other words, the lifting motion in the crane mode is not stopped. In the crane mode, if the motion stops while the object is suspended, the object may violently move around and collide with an obstacle due to inertial force, which increases the risk of a hazard. In this case, it is preferable to enable the motion of the lifting work of the hydraulic excavator 1, because it allows immediate measures to be taken to avoid hazards, such as lowering the object to the ground. That is, in the specific mode in which the risk of a hazard increases if the motion is stopped, the execution of the motion regulation based on the monitoring results is stopped to avoid hazards and ensure the safety of work with the hydraulic excavator 1.

In particular, when the monitoring unit 50 detects an obstacle in the surroundings of the hydraulic excavator 1, the control unit 60 executes the motion regulation when the operation mode is the normal mode, while it stops the execution of the motion regulation when the operation mode is the specific mode (steps S2, S4, S5, and S9).

When the monitoring unit 50 detects an obstacle, in the normal mode other than the specific mode, motion regulation of the hydraulic excavator 1 is executed so that the risk of the hydraulic excavator 1 colliding with the obstacle can be avoided. On the other hand, in the specific mode, the execution of the motion regulation of the hydraulic excavator 1 is stopped so that the hydraulic excavator 1 can continue to operate. This allows the hydraulic excavator 1 to execute motions to avoid a hazard in the specific mode, even when the monitoring unit 50 detects an obstacle, to ensure work safety.

In the present embodiment, the construction machine is the hydraulic excavator 1, and the specific mode is the crane mode for lifting an object (step S4). When the hydraulic excavator 1 is operating in the crane mode, stopping the motion of the hydraulic excavator 1 while the object is suspended may increase the risk of the object swinging and colliding with the obstacle. In the crane mode, even if the suspended object swings, the execution of the motion regulation of the hydraulic excavator 1 based on the monitoring results of the monitoring unit 50 is stopped to allow a motion that prevents the suspended object from colliding with an obstacle, thereby avoiding a hazard caused by such collision at an early stage.

When the control unit 60 accepts the specific mode setting by the input unit 72, the control unit 60 stops the execution of the motion regulation based on the monitoring results of the monitoring unit 50 (steps S4 and S9). By the operator operating input unit 72 to set the specific mode, the control unit 60 can recognize that the operation mode is the specific mode and control to stop the execution of the motion regulation based on the monitoring results of the monitoring unit 50.

The hydraulic excavator 1 is equipped with the alarm device 90. This allows the alarm device 90 to output alarms, for example, when the monitoring unit 50 detects an obstacle, regardless of whether the control unit 60 executes or stops the motion regulation, to alert the operator of the hydraulic excavator 1 or people in the surrounding area, thereby promoting work safety.

The hydraulic excavator 1 is equipped with the execution stoppage announcing device 100. The announcement of the stoppage of the execution of the motion regulation by the execution stoppage announcing device 100 can inform the operator of the hydraulic excavator 1 or people in the surrounding area of the fact that the execution of the motion regulation has been stopped and alert them to the fact.

The display 71 serves as the alarm device 90 and the execution stoppage announcing device 100, and the display 71 displays alarms based on the monitoring results of the monitoring unit 50 in addition to the images acquired by the monitoring unit 50 (step S3), and when the execution of the motion regulation stops, the display 71 displays information indicating the stoppage of the execution (step S10). In this configuration, multiple pieces of information to be provided to the operator (captured images, alarms, and information on the stoppage of the execution of motion regulation) are displayed together on one display 71. This allows the operator to easily recognize multiple pieces of information simply by looking at the display 71.

6. Others

In the description above, the crane mode is used as an example as a specific mode to execute motion regulation of the hydraulic excavator 1. However, the specific mode is not limited to the crane mode. For example, the specific mode may be a fall prevention mode, and in this case, the same control of execution/stoppage of motion regulation as in the present embodiment can be applied.

In the fall prevention mode, the position of the center of gravity of the hydraulic excavator 1, which changes in accordance with the orientation of the hydraulic excavator 1 (such as the pivoting angle of the boom 31 and arm 32 and the rotation angle of the upper revolving body 4), is calculated from the pivoting angle, etc. Based on the calculation results, motions for preventing falling (such as retracting movements of the boom 31 and arm 32) are automatically controlled by the control unit 60 on the basis of the calculated results. When regulation of the fall prevention motion is executed on the basis of obstacle detection by the monitoring unit 50 while the fall prevention mode is working, the retracting motion of the boom 31 and the arm 32 stops and fall prevention cannot be performed, thereby causing a risk in the hydraulic excavator 1 falling over. Therefore, by setting the fall prevention mode as a specific mode and stopping the execution of the motion regulation based on the monitoring results of the monitoring unit 50 in the fall prevention mode, the risk of the hydraulic excavator 1 falling over can be avoided by enabling the execution of the motion for preventing falling over.

When the hydraulic excavator 1 is configured so that a grappler (not illustrated) can be attached to the end of the work machine 3 as an attachment in place of the bucket 33, the specific mode may be a grapple mode in which work is performed with the grappler. When motion regulation is executed based on obstacle detection by the monitoring unit 50 while the grappler is working to grab a heavy object, the motion of the grappler may stop while the grappler is grabbing the heavy object still in the air. In this case, there is a risk of the heavy object gripped by the grappler of falling. Therefore, by setting the grapple mode as the specific mode and stopping the execution of motion regulation based on the monitoring results of the monitoring unit 50 when the grapple mode is set, the motion of placing the heavy object gripped by the grappler on the ground can be made possible to avoid the risk of the heavy object falling.

The embodiment of the present invention has been described above. However, the scope of the invention is not limited thereto. The invention can be carried out within an extended or modified range without departing from the gist of the invention.

INDUSTRIAL APPLICABILITY

The present invention is applicable to a construction machine such as a hydraulic excavator.

DESCRIPTION OF REFERENCE NUMERALS

1: hydraulic excavator (construction machine)
41*b* manipulation unit
50 monitoring unit
60 control unit
71 display (alarm device, execution stoppage announcing device)
72 input unit
81 revolving lamp (alarm device, execution stoppage announcing device)
82 light emitter (alarm device, execution stoppage announcing device)
83 sounding unit (alarm device, execution stoppage announcing device)
90 alarm device
100 execution stoppage announcing device

The invention claimed is:

1. A construction machine comprising:
  a monitoring unit that monitors surroundings of the construction machine; and
  a control unit that controls execution of motion regulation of the construction machine based on a monitoring result of the monitoring unit in accordance with an operation mode of the construction machine,
  wherein the control unit executes the motion regulation based on the monitoring result when the operation mode is a normal mode other than a specific mode, while the control unit stops the execution of the motion regulation based on the monitoring result when the operation mode is the specific mode, and
  wherein the specific mode comprises a crane mode for lifting an object.

2. The construction machine according to claim 1, wherein when the monitoring unit detects an obstacle in the surrounding of the construction machine, the control unit executes the motion regulation when the operation mode is the normal mode, while the control unit stops the execution of the motion regulation when the operation mode is the specific mode.

3. The construction machine according to claim 1, wherein the construction machine comprises an excavator.

4. The construction machine according to claim 1, further comprising an input unit that accepts a setting of the specific mode, wherein the control unit stops the execution of the motion regulation based on the monitoring result when the specific mode is accepted by the input unit.

5. The construction machine according to claim 1, further comprising an alarm device that outputs an alarm based on the monitoring result of the monitoring unit.

6. The construction machine according to claim 5, further comprising an execution stoppage announcing device that announces stoppage of the execution of the motion regulation when the control unit stops the execution of the motion regulation based on the monitoring result.

7. The construction machine according to claim 6, wherein
- the monitoring unit monitors the surroundings of the construction machine by acquiring images of the surroundings of the construction machine,
- the construction machine comprises a display that displays the images acquired by the monitoring unit,
- the display also serves as the alarm device and the execution stoppage announcing device, and
- in addition to displaying the images, the display displays the alarm based on the monitoring result of the monitoring unit, and when the execution of the motion regulation is stopped, the display further displays information indicating the stoppage of the execution.

* * * * *